Figure 1:
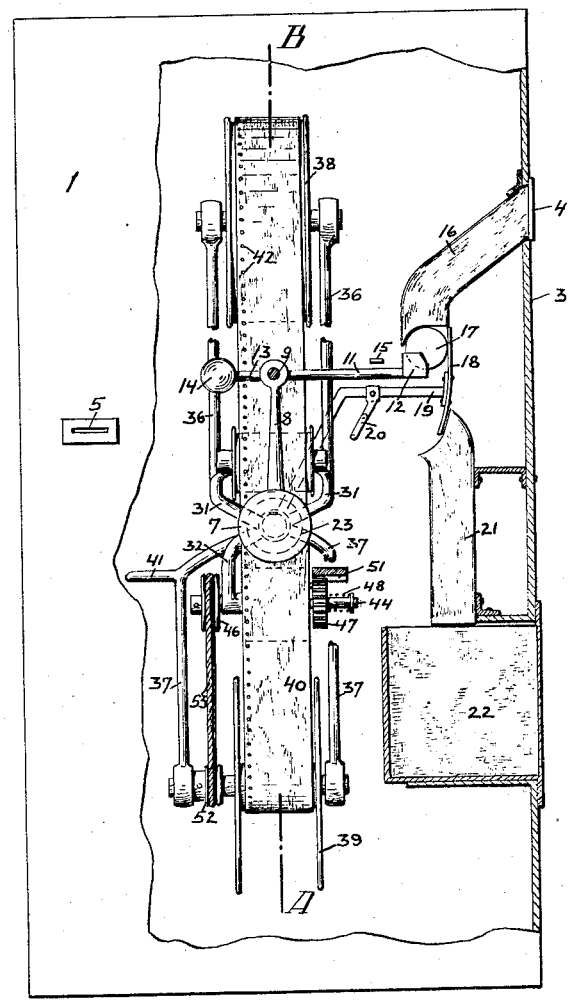

April 26, 1932.     H. REICHERT     1,855,200
APPARATUS FOR THE IDENTIFICATION OF PERSONS USING
AUTOMATIC AND CHECKING MACHINES
Filed March 22, 1930     4 Sheets-Sheet 1

Inventor:
Hans Reichert
by Locke x Kellenbeck
Attorneys.

A-B

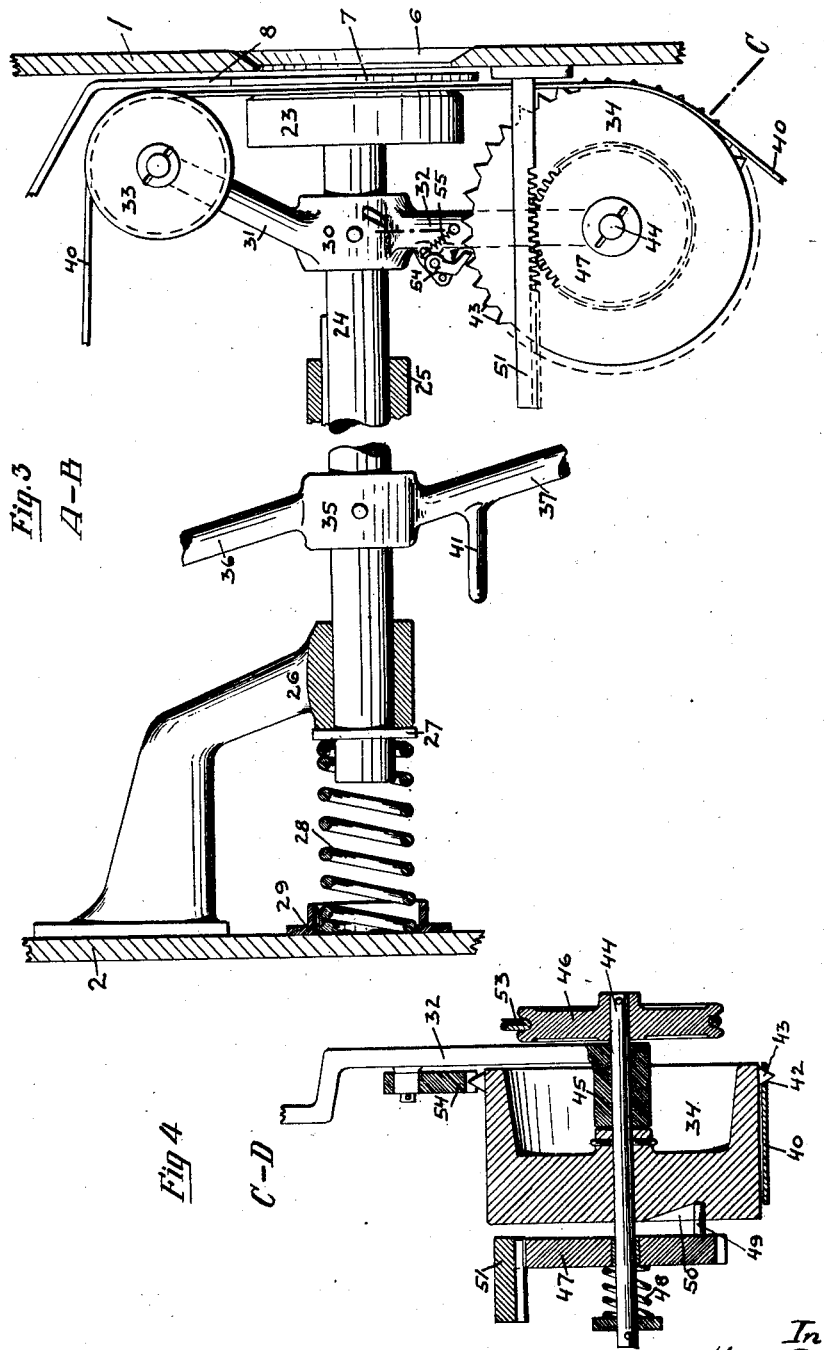

April 26, 1932. H. REICHERT 1,855,200
APPARATUS FOR THE IDENTIFICATION OF PERSONS USING
AUTOMATIC AND CHECKING MACHINES
Filed March 22, 1930 4 Sheets-Sheet 4

Inventor:
Hans Reichert
by
Lotka & Kellenbeck
Attorneys.

Patented Apr. 26, 1932

1,855,200

UNITED STATES PATENT OFFICE

HANS REICHERT, OF BERLIN, GERMANY, ASSIGNOR OF ONE-THIRD TO TALLIMIT-BILD-GESELLSCHAFT, OF BERLIN, GERMANY, A COMPANY OF GERMANY

APPARATUS FOR THE IDENTIFICATION OF PERSONS USING AUTOMATIC AND CHECKING MACHINES

Application filed March 22, 1930, Serial No. 438,052, and in Germany March 26, 1929.

My invention relates to automatic machines and checking machines in which it is desirable that the identity of the person using the machine can be shown. For instance there are automatic insuring machines which when operated by a coin will issue insurance tickets for accident insurance, traveller's insurance, shipping insurance, and the like. When an insurance is claimed it is necessary to show that claimant is in fact the person who has contracted the insurance. Heretofore, cards were issued by the automatic machines aforesaid, or a receipt was printed by them on tickets, luggage slips, and the like. In other cases, as in checking clocks for watchmen, it is desirable to show that the watchman, and no other, has operated the clock. There are other apparatus in which such proof of identity is also desirable. Such machines heretofore either require the signature of the person, as the automatic insuring machine, or a special key, as the watchmen's clock.

My invention relates to a novel method and to novel means for demonstrating the identity in a more reliable manner than in the old apparatus aforesaid. Particular stress is laid on simplicity and on the exclusion of fraud for in the old apparatus falsifications were possible, apart from the inconvenience that writing materials for the signature of the person are not always available.

I employ dactyloscopy for showing the identity of the person. The user of my apparatus is compelled to leave a fingerprint on a checking means as, for instance, on a checking slip. An automatic machine in which my method is performed, may be equipped with a continuous band of paper for the slips on which band the person leaves the fingerprint. In order to coordinate the fingerprint left and the card issued by the machine both may be printed with the same number by a recording counter. When the insurance ticket is presented the slip of a given number will show the fingerprint of the person who has taken the ticket and the insurance sum will be paid to this person, or to his or to her legal representatives.

The person might neglect to leave the fingerprint after the card has been issued by the coin-freed mechanism of the machine. This is prevented according to my further method by causing the issuing of the card, the printing of a receipt on a ticket or the like, etc., to be effected by the same pressure of the finger by which the fingerprint is made on the slip. In an apparatus issuing the insurance ticket only after payment of a coin, this may be accomplished in such a manner that at first the coin dropped into the apparatus frees the releasing mechanism which, thereafter, when operated by the pressure of the finger issues the card or performs the corresponding operation.

The device for the application of the method according to my invention consists in an apparatus provided with checking means for fingerprints which as often as a print has been made thereon is fed forward and is ready to receive a new fingerprint. The device for the application of the further method consists in an apparatus in which the checking means for fingerprints are so combined with the releasing mechanism of the apparatus that the releasing mechanism may be operated and the fingerprint be left on the checking means by the same pressure of a finger of the person who uses the apparatus.

My invention will now be described by way of example as applied to an automatic machine issuing insurance tickets but it is understood that my invention may be applied to all other automatic machines or apparatus in which proof of identity is desirable.

In the accompanying drawings

Figure 2:
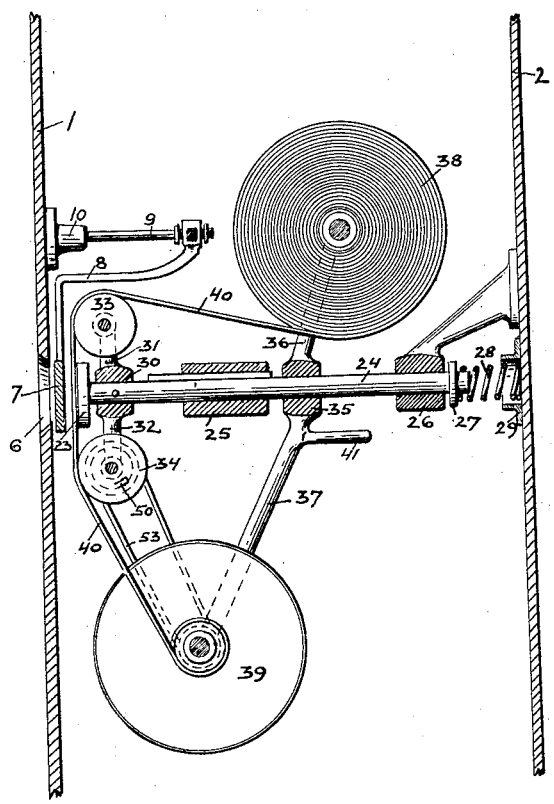
Figure 5:
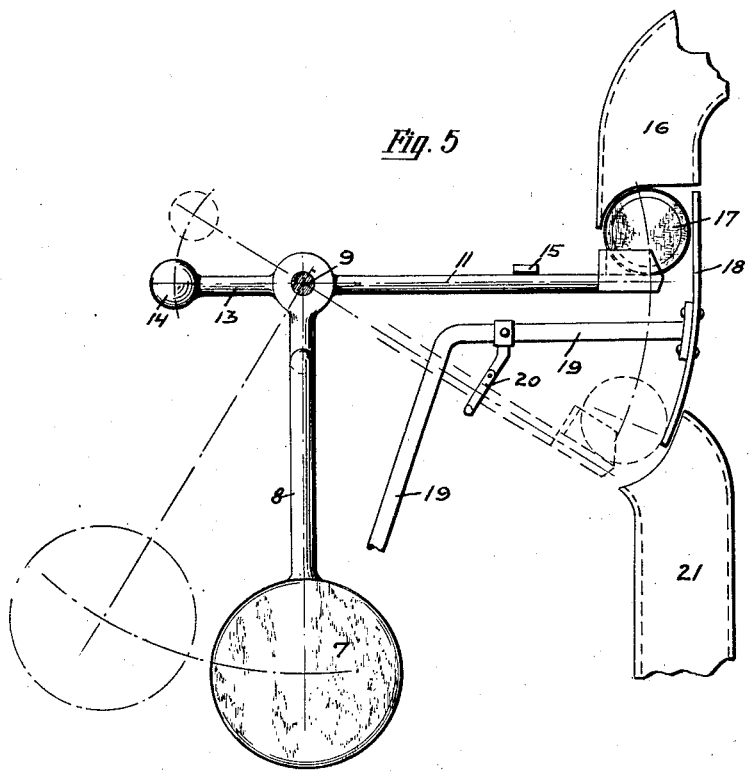
Figure 6:
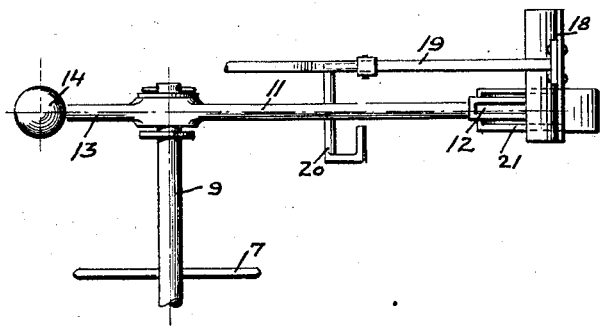

Fig. 1 is a front-end elevation of the machine, with the front wall partly removed, Fig. 2 is a longitudinal section (on the line A—B of Fig. 1) of the part equipped with the releasing mechanism, Fig. 3 is an elevation of the releasing means with the guide for the slip, Fig. 4 is a section (on the line C—D of Fig. 3) of the slip-feeding means, Fig. 5 is a front-end elevation of the mechanism which frees the releasing means when operated by a coin, Fig. 6 is a plan view of Fig. 5.

Referring now to the drawings, 1 and 2 are the front and rear walls of the machine, 3 is one of its side walls, and 4 is the coin slot in the side wall. 5 is the opening from which the cards are issued in the front wall. The mechanism for issuing the cards has not been shown as it forms no part of the invention. 6 is an opening at the rear of which the finger-operated releasing mechanism is arranged. The opening 6, located in the front wall 1, is concealed by a plate 7 within, and 8 is a crooked arm on which plate 7 is fitted to rock about a shaft 9. 10 is a bearing for the shaft 9 at the front wall 1. Levers 11 and 13 are connected with the crooked arm 8 and equipped respectively with a scoop 12 and a balance weight 14. The balance weight is so determined that the plate 7 in its normal position closes the opening 6, and the lever 11 engages a stop 15 at slight pressure. 16 is a coin chute extending from the coin slot 4 to the scoop 12 so as to deliver a coin 17 to the scoop. Opposite the scoop 12 a movable wall 18 is arranged at such a distance that a coin in the scoop is retained by the wall 18. By means of arm 19 wall 18 is connected with the pressure operated releasing mechanism which will presently be described, and is adapted to move with such mechanism from the front to the rear, that is, from the front wall to the rear wall of the machine. Arm 19 is equipped with a hook 20 which is open at the rear and is able to engage lever 11 if it descends under the weight of a coin in its scoop 12 and the arm 19 has been moved to the rear by the releasing mechanism. Below the point which the end of the scoop 12 reaches when the lever 11 has descended, there is a further coin chute 21 ending in the coin box 22. The box 22 is inserted in the side wall 3, and adapted to be locked.

The releasing or starting mechanism includes a pressure plate 23 with a shank 24, and 25 and 26 are brackets in which the shank is fitted to slide without rotating. At its rear end the shank is equipped with a flange 27 which is engaged by a spring 28. The other end of the spring is abutted against the rear wall 2, being guided by a ring 29. The spring moves the pressure plate to the front in its normal position until flange 27 abuts against the front face of bracket 26. A sleeve 30 having arms 31 and 32 is fixed on shank 24. 33 is a guiding roller at the end of arm 31, and 34 is a paper feeding roller at the end of arm 32. 35 is another sleeve which is equipped with arms 36 and 37, 38 is a supply roller on arm 36, and 39 is a winding roller on arm 37 for paper band 40 on which the finger prints are made. 41 is an extension of arm 37 which by its reciprocating motion issues the insurance tickets through means which are not shown as they form no part of the present invention. Paper band 40 which may be impregnated so as to more readily receive the fingerprints, is provided at its side with perforations 42 into which projections 43 on the feeding roller 34 may engage. Shaft 44 of the roller 34 is equipped with a pulley 46 outside its bearing 45 on the arm 32, and 54 is a pawl with a spring 55 which pawl cooperates with the projections 43 and permits rotation of the feeding roller 34 in one direction only, 47 is a pinion which is free to turn on the other end of the shaft 44, and 48 is a spring holding the pinion in contact with roller 34. 49 is a projection on the pinion 47 which is adapted to engage an inclined groove 50 in the front face of the roller 34. 51 is a rack meshing with the pinion 47 which rack is secured to the wall 1 and is so wide as to remain engaged with the pinion when the pinion is displaced axially. 52 is a pulley of smaller diameter than the pulley 46 said pulley 52 being connected with the winding roller 39, and 53 is a cord of any suitable material preferably of rubber by which pulley 52 is operated, but the cord etc. may slip on one of the pulleys if this is required when winding strip 40 on roller 39, on account of its increase in diameter.

When a coin 17 is inserted in slot 4 it is dropped into the scoop 12 of lever 11 through chute 16, and is intercepted by wall 18. Under the weight of the coin lever 11 moves downwards and moves plate 7 to the left, laying open the opening 6 and giving access to the paper band 40. When pressure is exerted by the finger on paper band 40 and the pressure plate 23 behind, shank 24 is moved to the rear with all the parts it supports, and the following operations are effected:

(1) Arm 19 moves wall 18 and hook 20 to the rear, coin 17 is freed and dropped into box 22 through chute 21. In the meantime hook 20 has engaged lever 11 and holds it in position.

(2) Pinion 47 moves along the rack 51 and is thus rotated, projection 49 leaves groove 50 and slides on the face of the roller 34 as the roller is held against rotation by pawl 54.

(3) Paper band 40 with the rollers 33, 34, 38, and 39 is moved in the same direction as the pressure plate 23, without the paper being displaced with respect to the plate.

(4) Projection 41 follows the movement and transfers it to the card-issuing mechanism.

(5) The pressing finger prints its lines on the paper band 40.

When the finger is retracted, spring 28 moves shank 24 and plate 23 into their initial position, and the following operations are effected:

(1) Hook 20 releases lever 11 so that plate 7 under the action of balance weight 14 returns to its initial position and closes the opening 6 in front of the pressure plate 23. At the same time, wall 18 returns to its initial position in front of scoop 12.

(2) Pinion 47 is rotated in opposite direction by its rack 51, causing the projection 49 to reenter groove 50 and to rotate the feeding roller 34 so that the paper band is fed across the pressure plate 23. At the same time the pulley and cord mechanism 46, 52, and 53 winds the band on the roller 39.

(3) Projection 41 operates the issuing mechanism and a card is dropped from the opening 5.

It is understood that my invention may be modified in various ways without departing from the gist thereof. For instance, the band 40 may move within the pressure plate 23 if the finger lines are copied on the slip by resilient material on the front face of the plate. It is not necessary to provide a continuous band for the slips but separate slips of paper or the like may be fed for receiving the fingerprints. Counters and number-printing means may be connected with my machine for providing each of the cards and its slip with identical numbers. In checking apparatus for watchmen and the like cards may not be issued but instead means may be provided for printing the time at which the fingerprint has been made.

The above suggested changes and many others which may appear to those skilled in the art, are to be construed as included within the proper scope of this invention as it is defined in the sub-joined claims.

Having described my invention, what I claim as new and desire to secure by Letters Patent of the United States is:

1. A finger-printing device comprising a member movable in response to finger pressure, means for returning said member to its original position when pressure is discontinued, and means, actuated by the first-mentioned means, during the return movement of said movable member, for feeding a finger-print receiving element across that surface of said member which is nearest to the pressing finger, while such element remains stationary relatively to said member during the time that pressure is being exerted by the finger.

2. A finger-printing device comprising a plate movable in response to finger pressure against its forward face, means for returning said plate to its original position when pressure is discontinued, and means, actuated by the first-mentioned means, during the return movement of said movable plate, for feeding a strip of finger-print receiving material across said forward face of the plate, while such strip remains stationary relatively to said plate during the time that pressure is exerted by the finger.

3. A finger-printing device comprising a member movable bodily in response to finger pressure, means for bringing a finger-print receiving element into position in front of said member, and means for returning said member to its original position when the person using the device ceases to exert finger pressure against said element and member, said first-mentioned means being actuated by said second-mentioned means.

4. A device according to claim 3, provided with a guide engaging the movable member to insure rectilinear movement thereof.

5. A device according to claim 3, in which the movable member consists of a plate forming a backing for the portion of the finger-print receiving element which the finger engages.

6. A device of the class described, comprising a member movable in response to finger pressure, means for returning said member to its original position when pressure is discontinued, means, actuated by the first-mentioned means, during the return movement of said movable member, for feeding a finger-print receiving element across the surface of said member, and means, connected with said member, for initiating the operation of an associated mechanism.

7. A coin-controlled device of the class described, comprising a member movable in response to finger pressure, a shutter normally blocking access to said member, coin-operated means for moving the shutter out of its blocking position into its open position, means, connected with said member, for retaining the coin when said member is in its initial position and for releasing said coin when such member has been shifted by finger pressure, and means connected with said member for holding the shutter in its open position as long as finger pressure is exerted on said member, and means, connected with said member, for initiating the operation of an associated mechanism.

8. A device according to claim 7, in which the shutter swings in unison with a coin-lever and in which the movable member carries a hook to lock said lever in the position in which the shutter is open.

9. A device according to claim 7, in which the movable member carries an element which in the initial position of said member retains the coin, but releases such coin when said member has been shifted by finger pressure.

10. A device according to claim 7, in which means is provided to return the movable member to its original position upon the cessation of finger pressure, such return movement releasing the shutter to cause the latter to return automatically to its blocking position.

In testimony whereof I affix my signature.

HANS REICHERT.

CERTIFICATE OF CORRECTION.

Patent No. 1,855,200.  Granted April 26, 1932, to

HANS REICHERT.

It is hereby certified that the name of the assignee of one-third interest in the above numbered patent was erroneously described and specified as "Tallimit-Bild-Gesellschaft", whereas said name should have been described and specified as Tallimit-Bild-Gesellschaft m. b. H., as shown by the records of assignments in this office; and that the said Letters Patent should be read with this correction therein that the same may conform to the record of the case in the Patent Office.

Signed and sealed this 7th day of June, A. D. 1932.

(Seal)

M. J. Moore,
Acting Commissioner of Patents.